US010229385B2

(12) United States Patent
Evers et al.

(10) Patent No.: US 10,229,385 B2
(45) Date of Patent: Mar. 12, 2019

(54) FREE LOCATION ITEM AND STORAGE RETRIEVAL

(71) Applicant: Toyota Motor Engineering & Manufacturing North America, Inc., Erlanger, KY (US)

(72) Inventors: Gregory Evers, Kitchener (CA); Enrique D. Espinosa, Kitchener (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 638 days.

(21) Appl. No.: 14/823,709

(22) Filed: Aug. 11, 2015

(65) Prior Publication Data
US 2017/0046654 A1 Feb. 16, 2017

(51) Int. Cl.
*G06Q 10/08* (2012.01)
*G06Q 10/06* (2012.01)

(52) U.S. Cl.
CPC ..... *G06Q 10/087* (2013.01); *G06Q 10/06315* (2013.01)

(58) Field of Classification Search
CPC ........................ G06Q 10/087; G06Q 10/06315
See application file for complete search history.

(56) References Cited

U.S. PATENT DOCUMENTS

| 6,341,269 B1 | 1/2002 | Dulaney et al. | |
| 2007/0142935 A1* | 6/2007 | Danielsson | G06F 8/10 700/29 |
| 2007/0174146 A1* | 7/2007 | Tamarkin | G06Q 10/087 705/28 |
| 2010/0030718 A1* | 2/2010 | Anderson | G06F 17/30554 706/47 |
| 2011/0200420 A1 | 8/2011 | Driskill et al. | |
| 2012/0109793 A1* | 5/2012 | Abeles | G06Q 40/02 705/31 |

(Continued)

OTHER PUBLICATIONS

Speh, "Understanding Warehouse Costs and Risks", Ackerman Warehousing Forum, Jun. 2009, vol. 24, No. 7, The Ackerman Company, Columbus, Ohio (6 pages).

(Continued)

*Primary Examiner* — Sujay Koneru
(74) *Attorney, Agent, or Firm* — Christopher G. Darrow; Darrow Mustafa PC (57) ABSTRACT

Inventory is managed to minimize the footprint of storage spaces affected by variable production volumes and high inventory turnover. A warehouse includes a plurality of storage spaces for storage of items in the inventory. In response to receiving a request to store or retrieve a particular item, a recommended storage space in the warehouse can be determined for the particular item. The determination can be at least partially based on one or more user-defined facts, one or more user-defined rules, and a current state of the warehouse at the time the item location request is received. The user-defined facts can relate to an item, the inventory, the plurality of storage spaces, and/or the warehouse. The user-defined rules can be configured to dynamically assign storage spaces to the warehouse based at least partially on user-defined indications of how items will be consumed during a workflow performed within the warehouse.

13 Claims, 6 Drawing Sheets

(56) References Cited

U.S. PATENT DOCUMENTS

| | | | |
|---|---|---|---|
| 2013/0338819 A1* | 12/2013 | Max | B65G 1/137 700/216 |
| 2015/0046363 A1* | 2/2015 | McNamara | G06Q 10/0833 705/333 |
| 2015/0262118 A1* | 9/2015 | Grissom | G06Q 10/087 700/216 |

OTHER PUBLICATIONS

Vrysagotis et al., "Warehouse layout problems : Types of problems and solution algorithms", Journal of Computations & Modelling, 2011, pp. 131-152, vol. 1, No. 1, International Scientific Press (22 pages).

Narmadha et al., "Efficient Inventory Optimization of Multi Product, Multiple Suppliers with Lead Time using PSO", International Journal of Computer Science and Information Security, 2010, pp. 180-189, vol. 7, No. 1 (10 pages).

Lee; "Multi-Echelon Inventory Optimization", Evant White Paper Series, 2003, Evant Inc. (15 pages).

\* cited by examiner

FREE LOCATION ITEM AND STORAGE RETRIEVAL

FIELD

The subject matter described herein relates in general to the storage and/or retrieval of items and, more particularly, to optimizing the storage and/or retrieval of items.

BACKGROUND

Inventory levels are a cost of business and must be managed in a cost efficient manner. Inventory level controls and inventory replenishment techniques are implemented to optimize inventory. There are various types of such controls and techniques. Some inventory controls are reactionary in nature because they operate relative to perceived shortages in existing inventory. Some inventory controls are preemptive in nature because they try to anticipate demand based on known criteria. Some inventory replenishment techniques are configured to ensure that orders can be immediately satisfied by keeping required items in stock during the replenishment cycle. The degree of success in implementing such controls and techniques is at least partially dependent upon the efficiency in which warehousing operations are run, including optimizing the storage space and item handling time as items move in and out of a warehouse.

SUMMARY

In one respect, the present disclosure is directed to a method of managing an inventory in a warehouse. The inventory includes a plurality of items. The warehouse includes a plurality of storage spaces for storage of the plurality of items. The method includes receiving an item location request. The item location request can be a storage request or a retrieval request for a particular item. The method includes, responsive to receiving the item location request, determining a recommended storage space in the warehouse in which to store the particular item or from which to retrieve the particular item. The determining can be at least partially based on: one or more user-defined facts, one or more user-defined rules, and a current state of the warehouse at the time the item location request is received. The user-defined facts can relate to an item, the inventory, the plurality of storage spaces, and/or the warehouse. The user-defined rules can be configured to dynamically assign storage spaces to the warehouse based at least partially on user-defined indications of how items will be consumed during a workflow performed within the warehouse.

In another respect, the present disclosure is directed to a system for managing an inventory in a warehouse. The inventory can include a plurality of items. The warehouse can include a plurality of storage spaces for storage of the plurality of items. The system includes a user input system and a processor operatively connected to the input system. The processor can be programmed to initiate executable operations. The executable operations can include receiving an item location request from the user input system. The item location request can be a storage request or a retrieval request for a particular item. The executable operations can include, responsive to receiving the item location request, determining a recommended storage space in the warehouse in which to store the particular item or from which to retrieve the particular item. The executable operations of such determining can be at least partially based on: one or more user-defined facts, one or more user-defined rules, and a current state of the warehouse at the time the item location request is received. The user-defined facts can relate to an item, the inventory, the plurality of storage spaces, and/or the warehouse. The user-defined rules can be configured to dynamically assign storage spaces to the warehouse based at least partially on user-defined indications of how items will be consumed during a workflow performed within the warehouse.

DETAILED DESCRIPTION

This detailed description relates to managing an inventory of a plurality of different items in a warehouse. The warehouse includes a plurality of storage spaces for storage of the plurality of different items. In response to receiving a request for a storage space to store an item into or retrieve an item from, a recommended storage space in the warehouse in which to store the particular item or from which to retrieve the particular item can be determined. The determination can be at least partially based on: one or more user-defined facts, one or more user-defined rules, and a current state of the warehouse at the time the item location request is received. The present detailed description relates to systems, methods and computer program products that incorporate one or more of such features.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
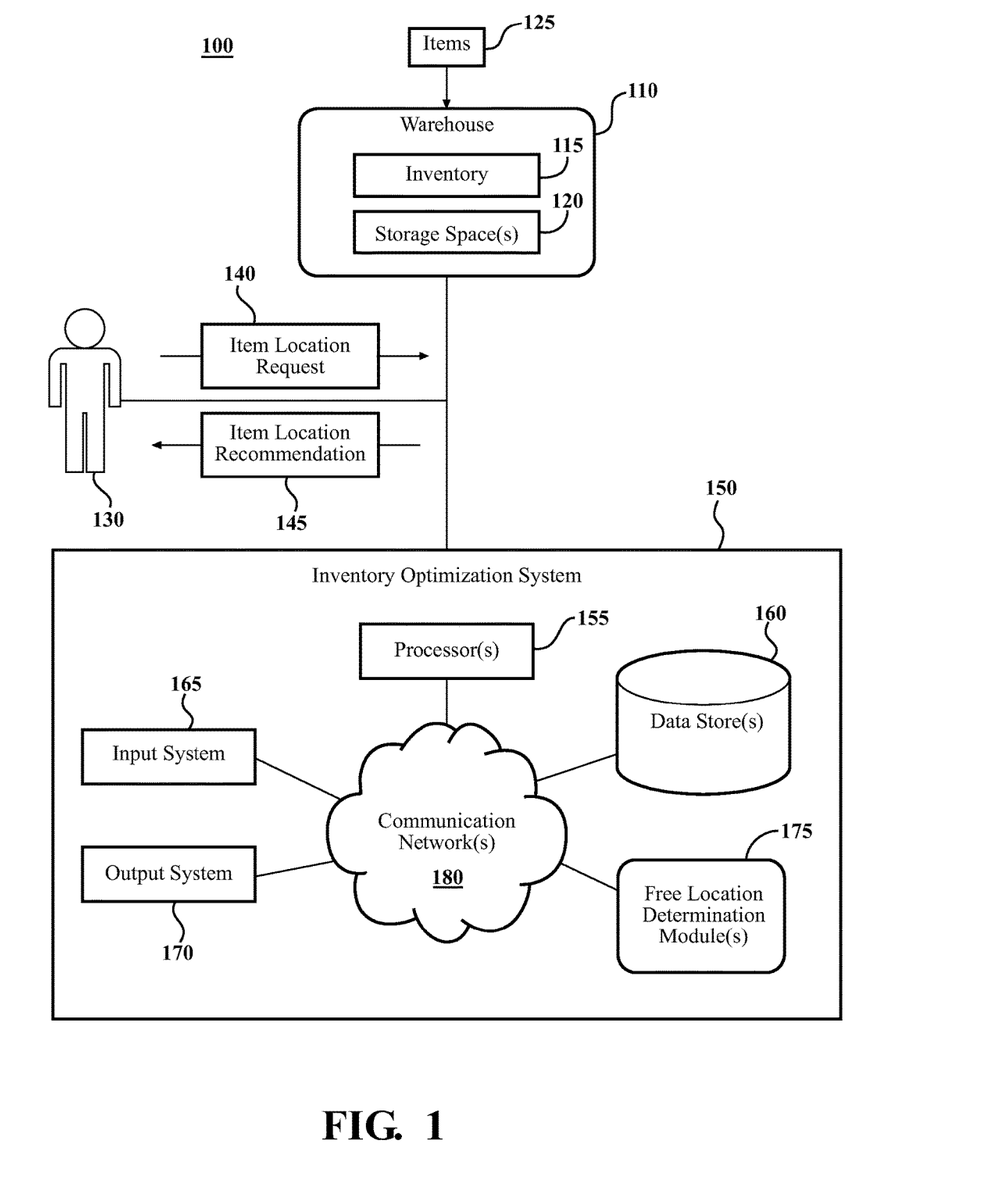
FIG. 1 is an example of a free location system for managing the storage and/or retrieval of items.

FIG. 1 is an example of a free location system 100 for managing the storage and/or retrieval of items. Some of the possible elements of the system 100 are shown in FIG. 1 and will now be described. However, it will be understood that it is not necessary for the system 100 to have all of the elements shown in FIG. 1 or described herein. The system 100 can include a warehouse 110 and an inventory optimization system 150. Each of these elements of the system 100 will be described in greater detail below.

As used herein, the term "warehouse" means any physical space or area in which one or more tangible items can be stored. In one or more arrangements, the warehouse 110 can be in an industrial setting. In such case, the warehouse 110 can be a physical storage space where items are kept during production. In one or more arrangements, the warehouse 110 can have variable production volumes. Alternatively or in addition, the warehouse 110 can have a high inventory turnover rate (e.g., more than one time per day). The warehouse 110 can be indoors and/or outdoors, depending on the particular application.

While arrangements described herein will be presented in connection with an industrial production setting, it will be understood that arrangements described herein are not limited to such an application. As an example, in one or more arrangements, the warehouse 110 can be a parking lot.

The warehouse 110 can be an asset to a business process or workflow performed therein. The warehouse 110 can be used at any suitable point in connection with a workflow. For instance, the warehouse 110 can be used at the beginning of a workflow, in the middle of a workflow, and/or at the end of a workflow. The warehouse 110 can have associated spatial properties (e.g., layout, storage space(s) 120) and business properties.

The warehouse 110 can have an inventory 115. "Inventory" is a list of items that are stored in a warehouse at a given point in time and the associated quantity of each item. In one or more arrangements, the inventory 115 can be the list of items used as a source of material for manufacturing process. However, it will be understood that the inventory can include other items that are not used in the manufacturing process or other activity that occurs at the warehouse 110. Such items can be incidental to the manufacturing process or whatever activity occurs at the warehouse 110. The inventory 115 can be variable throughout a workflow.

A plurality of items 125 can be received in the warehouse 110. As used herein, the term "item" means any tangible goods. "Item" includes goods at rest and/or goods in motion. The items 125 can also leave the warehouse 110. The items 125 may leave the warehouse 110 in a different form than when they were received. For instance, an item 125 received in the warehouse 110 can leave the warehouse 110 as part of an assembly or a subassembly. The plurality of items 125 in inventory 115 can be a plurality of different items.

The items 125 can be tagged, configured, designated, and/or marked to enable the items 125 to be tracked as they are moved within the warehouse 110. Any suitable manner of tagging, configuring designating, and/or marking can be used. For instance, the items 125 can include a barcode, QR code, and/or radio-frequency identification (RFID) tag, just to name a few possibilities. Alternatively or in addition, the items 125 can have an associated transponder, signal beacon, GPS transmitter, and/or other location signaling technology.

The items 125 can be maintained in the warehouse 110. As used herein, "maintenance" includes a set of actions, in a time frame, designed to keep the inventory in a state that is considered to be optimal from a cost-effectiveness point of view (e.g., small enough to prevent it from becoming a liability, but large enough so that it can feed the production line with a steady stream of items).

The plurality of items 125 received in the warehouse 110 can be stored therein and/or one or more of the items 125 can be immediately used. The warehouse 110 can include one or more storage spaces 120. "Storage space" means any space or area where items can be stored or otherwise at rest awaiting use. The storage space 120 can have any suitable form. Examples of the storage space 120 can include a room, a bay, a shed, a dock, a closet, a box, a bin, a shelf, a cabinet, a drawer, a chest, a container, a rack, a case, a pit, a compartment, just to name a few possibilities.

The storage space 120 can allow items to be stored horizontally and/or vertically. For instance, items can be stored substantially horizontally. As a non-limiting example of a substantially horizontal storage space, items can be stored on a single shelf or other support surface. In such case, the items can be stored in one or more rows and/or columns, or in any other suitable manner and/or arrangement. Alternatively or in addition, the items can be stored substantially vertically by stacking the items 125 on directly upon each other or in a spaced relation to each other. For instance, a plurality of items can be stored on a plurality of vertically spaced locations or spaces. As a non-limiting example of such vertically spaced storage spaces, items can be stored on a plurality of shelves. As used herein, the term "substantially" includes exactly the term it modifies and slight variations therefrom. Thus, the term "substantially horizontally" means exactly horizontal and slight variations therefrom.

In one or more arrangements, the warehouse 110 can have one or more associated users 130. A "user" can be any person or thing that handles and/or moves materials and/or items within the warehouse. In some instances, the user 130 can be a human being (e.g., a forklift operator, a mover, etc.). However, in some instances, the user 130 can be a robot or other automated and/or controllable system, device, and/or element. In other instances, the warehouse 110 may not have an associated user.

As noted above, the system 100 can include an inventory optimization system 150. The inventory optimization system 150 can be located within the warehouse 110. In one or more arrangements, one or more elements of the inventory optimization system 150 can be located external to and/or remote from the warehouse 110. In one or more arrangements, the inventory optimization system 150 can be entirely located remote from the warehouse 110. In such case, the inventory optimization system 150 can be accessed by a user 130 by a computing device communicatively linked to the inventory optimization system 150.

Some of the possible elements of the inventory optimization system 150 are shown in FIG. 1 and will now be described. It will be understood that it is not necessary for the inventory optimization system 150 to have all of the elements shown in FIG. 1 or described herein. The inventory optimization system 150 can have any combination of the various elements shown in FIG. 1. Further, the inventory optimization system 150 can have additional elements to those shown in FIG. 1. In some arrangements, the inventory optimization system 150 may not include one or more of the elements shown in FIG. 1. Further, the elements of the inventory optimization system 150 may be physically separated by large distances. It should be appreciated that although particular elements are separately defined, each or any of the elements or portions thereof may be otherwise combined or segregated via hardware and/or software.

The inventory optimization system 150 can include one or more processors 155. As used herein, "processor" means one or more components that are configured to execute any of the processes described herein or any form of instructions to carry out such processes or cause such processes to be performed. The components may be disparate parts or part of a whole unit and may not necessarily be located in the same physical location. The processor 155 may be implemented with one or more general-purpose and/or one or more special-purpose processors. In arrangements in which there is a plurality of processors 155, such processors 155 can work independently from each other or one or more processors can work in combination with each other.

Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 155 can include at least one hardware circuit (e.g., an integrated circuit) configured to carry out instructions contained in program code.

The inventory optimization system 150 can include one or more data stores 160 for storing one or more types of data. The one or more data stores 160 can include volatile and/or non-volatile memory. Examples of suitable data stores 160 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 160 can be operatively connected to the processor 155 for use thereby.

The inventory optimization system 150 can include an input system 165. An "input system" is any device, component, system, element or arrangement or groups thereof that enable information/data to be entered into a machine. Any suitable input system 165 can be used, including, for example, a keypad, display, touch screen, multi-touch screen, button, joystick, mouse, trackball, microphone, camera, scanner, barcode scanner, QR code scanner, and/or combinations thereof.

In one or more arrangements, the input system 165 can be configured to receive an input from one or more of the users 130. For example, the user 130 can submit an item location request 140 using the input system 165. "Item location request" is a request for a recommended storage space in which to store a particular item or for a recommended storage space from which to retrieve a particular item. The user 130 can directly input the item location request 140 into the inventory optimization system 150 using the input system 165. Alternatively, the user 130 can send the item location request 140 to the inventory optimization system 150 indirectly, such as by sending the item location request 140 by a portable communication device (e.g., a smart phone, a tablet computer, a laptop computer, a mobile communication device, etc.) communicatively linked to the inventory optimization system 150.

The inventory optimization system 150 can include an output system 170. An "output system" is any device, component, system, element or arrangement or groups thereof that enable information/data to be presented. The output system 170 can present information/data to the one or more users 130. Any suitable output system 170 can be used. For instance, the output system 170 can be configured to provide visual and/or audial outputs. The output system 170 can include a display, a microphone, earphone, and/or speaker. Some components of the inventory optimization system 150 may serve as both a component of the input system 165 and a component of the output system 170.

In one or more arrangements, the output system 170 can be configured to provide an output to one or more of the users 130. For example, the output system 170 can present an item location recommendation 145 to a user 130. "Item location recommendation" is a recommended or suggested storage space from which a stored item can be retrieved or in which an item can be stored. The output system 170 can present the item location recommendation 145 in any suitable form, such as a visual and/or an audial form. As another example, the output system 170 can present an indication to a user 130 of the available storage spaces 120 for item retrieval or storage. In some instance, an available storage space 120 can be selected by a user 130 or some other entity.

The inventory optimization system 150 can include one or more free location determination modules 175. The one or more free location determination modules 175 can be implemented as computer readable program code that, when executed by a processor (e.g., the one or more processors 155), implement one or more of the various processes described herein. The free location determination module(s) 175 can be a component of one or more processors, or the free location determination module(s) 175 can be executed on and/or distributed among other processing systems to which a processor is operatively connected. In one or more arrangements, the free location determination module(s) 175 can be a component of the one or more processors 155. In one or more arrangements, the free location determination module(s) 175 can be executed on and/or distributed among other processing systems to which the one or more processors 155 are operatively connected.

The free location determination module(s) 175 can include instructions (e.g., program logic) executable by a processor. Such instructions can include instructions to execute various functions, transmit data to, receive data from, interact with, and/or control one or more elements of the system 100. In one or more arrangements, such instructions can include determining an optimized free location (e.g., a storage space 120) within the warehouse 110 for storing an incoming item. In one or more arrangements, such instructions can include determining an optimized location (e.g. a storage space 120) from which to retrieve a stored item for use. Such instructions can enable the various elements of the system 100 to communicate through the communication network 180. In one or more arrangements, the free location determination module(s) 175 can include artificial or computational intelligence elements, e.g., neural network, fuzzy logic or other machine learning algorithms.

The various components of the inventory optimization system 150 can be communicatively linked through one or more communication networks 180. As used herein, the term "communicatively linked" can include direct or indirect connections through a communication channel or pathway or another component or system. A "communication network" means one or more components designed to transmit and/or receive information from one source to another. One or more of the elements of the inventory optimization system 150 can include and/or execute suitable communication software, which enables the various elements to communicate with each other through the communication network 180 and perform the functions disclosed herein.

The one or more communication networks 180 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 180 further can be implemented as or include one or more wireless networks, whether short or long range. For example, in terms of short range wireless networks, the communication network 180 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 180 can include a mobile, cellular, and or satellite-based wireless network and support voice, video, text, and/or any combination thereof. Examples of long range wireless networks can include GSM, TDMA, CDMA, WCDMA networks or the like. The communication network 180 can include wired communication links and/or wireless communication links. The communication network 180 can include any combination of the above networks and/or other types of networks. The communication network 180 can include one or more routers, switches, access points, wireless access points, and/or the like.

Figure 2:
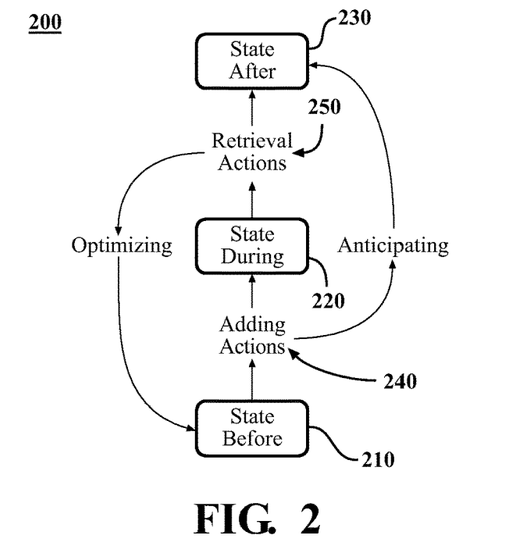
FIG. 2 is an example of a model for managing the storage and/or retrieval of items.

The free location determination module 175 will now be described in greater detail. Referring to FIG. 2, an example of a model 200 for managing free locations for items is shown. Prior to describing the model 200, the definitions of some terms will be provided. "Footprint" refers to the space allocated to goods at rest and/or goods in motion. "Time management" refers to the labor associated with the handling of items as they move into and/or out of a warehouse. "Actions" include tactical actions and strategic actions. "Strategic actions" are those actions that deal with shortages of and/or demand for one or more items. In many instances, strategic actions can be overseen by upper management personnel. "Tactical actions" are those actions relating to keeping track of inventory and/or executing inventory replenishment. In many instances, tactical actions are executed by middle management. "Key Performance Indicators" or "KPIs" are quantifiable measures. Examples of KPIs include footprint and time. KPIs can be used to compare performance.

Warehouse management includes a workflow that can have a before state 210 (e.g., an initial state). In the before state 210, KPIs are not necessarily optimal. A first set of actions can be enacted in the before state that can take the workflow to a during state 220 (e.g., an intermediate state). In the during state 220, the footprint has changed and time has elapsed. A second set of actions can be enacted in the during state 220 that can take the workflow to an after state 230 (e.g., a final state). In the after state 230, both footprint and time are optimized. The after state 230 can become the before state 210 for the next workflow cycle. The process can restart and iterate as long as production or other activity is occurring. It will be appreciated that knowing the current state of the workflow can allow the system to make decisions based on the state of the logistics pipeline of the warehouse 110.

Before a workflow begins, it is desirable to determine the ideal first set of actions that, if enacted, will cause the after state 230 to be optimal once the second set of actions are completed. The goal can be to keep the footprint used for all processes, as well as time, to a minimum. If this is possible, KPIs will then portray the outcomes of actions as achievable goals. The warehouse 110 will now be in a new before state, and will be ready to accept a new set of initial actions. The initial set of actions can be referred to as adding actions 240. "Adding actions" include business behavior that replenishes the inventory. Conversely, the final set of actions can be referred to as retrieval actions 250. "Retrieval actions" include business behavior that complete workflow as items move out of the warehouse.

The adding actions 240 and the retrieval actions 250 can be determined in any suitable manner. For instance, the adding actions 240 and/or the retrieval actions 250 can be determined by using one or more heuristic procedures. The adding actions 240 and/or the retrieval actions 250 can be provisioned as directives to be followed and/or implemented by a user 130. When the adding actions 240 are enacted, they can anticipate, at least implicitly, that the after state 230 of the warehouse 110 will be optimized once the retrieval actions 250 are completed, provided that the during state 220 of the warehouse 110 remains consistent. When the retrieval actions 250 are implemented correctly, it can imply that the current state of the warehouse 110 has remained optimized, as was anticipated. The after state 230 of the warehouse 110 can become the before state 210 in preparation for the next workflow cycle.

Figure 3:
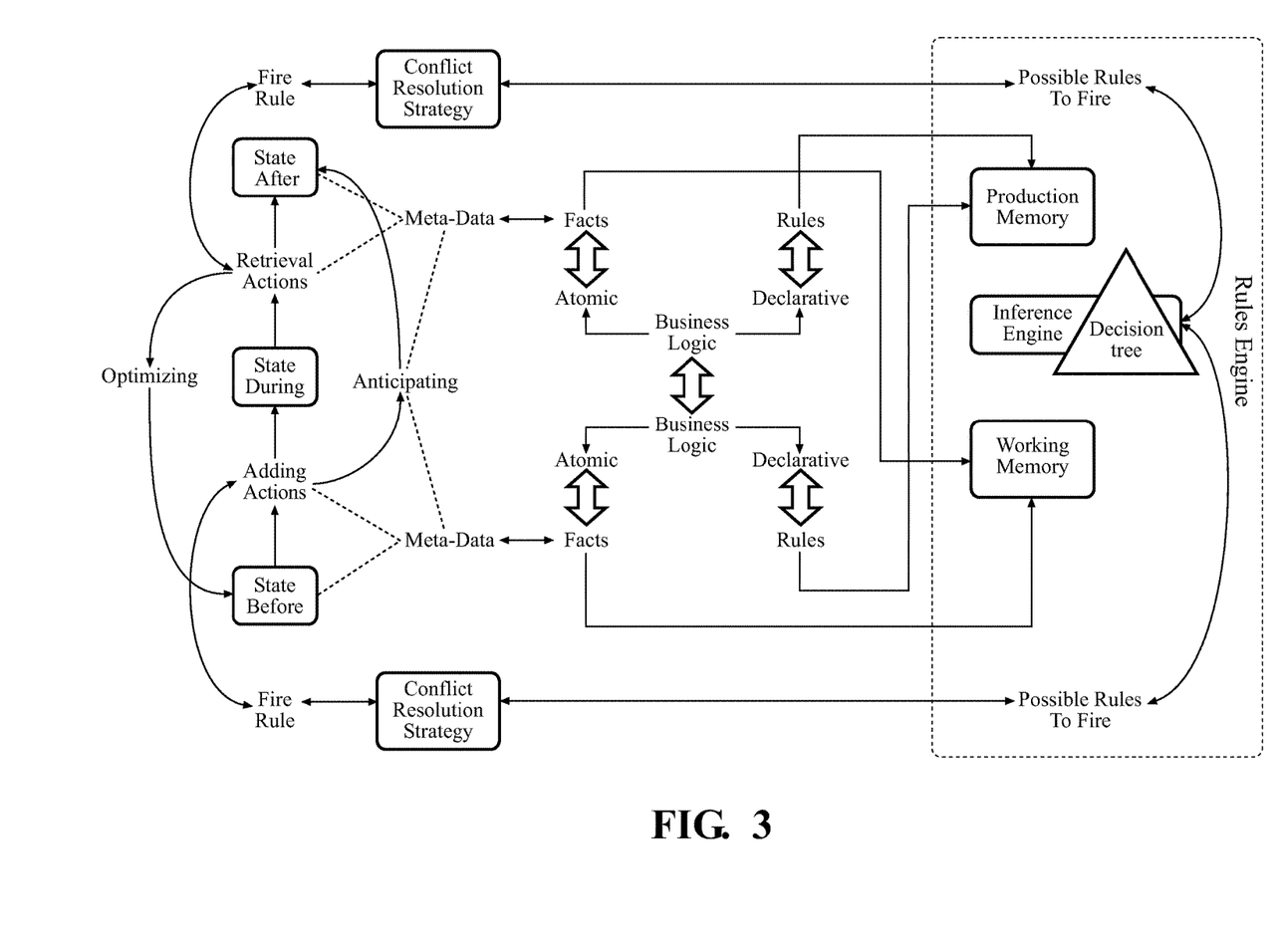
FIG. 3 is an example of a free location determination module.

The model 200 can be used at least in part as part of the free location determination module 175. FIG. 3 presents one example of the free location determination module 175. It will be understood, however, that arrangements are not limited to the particular free location determination module 175 shown.

The free location determination module 175 can infer and/or predict future shortages and/or future demand. The free location determination module 175 can do so in any suitable manner. For instance, the free location determination module 175 can reuse data regarding one or more characteristics of the warehouse 110 and/or the workflow (e.g., layout arrangement, transportation media, materials, items, etc.). The free location determination module 175 can regard such data as facts. The term "facts", is used to refer to propositional statements that describe truths about things in a particular domain. One example of a fact is that a particular item can be stored in a particular storage space (e.g., part A can be stored in storage spaces 1, 2, and 5). Another example of a fact is a characteristic, property, feature and/or attribute of a particular item (e.g., part B weight 200 pounds).

Alternatively or in addition, arrangements described herein can infer and/or predict future shortages and/or future demand using logical rules. "Logical Rules" or "Rules" is used herein to describe something (e.g., an action) if a condition is determined to be true. The logical rules can model behaviors within the warehouse 110 (e.g., material handling, restrictions, and/or other behavior) as logical rules. The logical rules can be described in any suitable form (e.g., if then else).

Successful enactment of the logical rules can result in the reduction of KPIs (e.g., footprint, time, and/or other KPI) of the warehouse 110. One example of a logical rule is that incoming items 125 are stored in the warehouse 110 on a first received basis. Another example of a logical rule is that the oldest items in storage are consumed first. Still another example of a logical rule is that items in storage are retrieved based on their expiration date. The logical rules can also include limits. As an example, one model rule can indicates that there can be at most a certain quantity of a particular item in the inventory 115 at any point in time. For instance, the maximum quantity of item X in the inventory 115 is five at any time.

The facts and logical rules can be updated on any suitable temporal basis. In one or more arrangements, the facts and the rules can be updated on a daily basis or more frequently. The facts and the logical rules can be collectively referred to "business logic and knowledge." Business logic and knowledge can enable inventory managers to continuously optimize the allocation of the storage spaces 120 to store items 125 in ways that can facilitate sharing storage spaces 120 among a plurality of different items 125.

Business logic and knowledge can use any suitable logical formulas. For instance, business logic and knowledge can use logical formulas of a rule-like form. In one or more arrangements, the formulas can include, at least in part, one or more Horn clauses. A "Horn clause" is defined as a disjunction of literals with at most one positive, un-negated, literal (e.g., $\neg p \neg \lor q \lor \ldots \neg t \lor u$). The literals can be modeled in any suitable manner. For instance, the literals can be modeled as clauses with zero or more variables, similar to and/or following logic programming standards. For example, the fact of whether an item exists in inventory consists of a clause with no literals, like isWeldShop, or one with N=1 variables, such as isWeldShop (SA).

According to arrangements described herein, some facts can convey meta-data (e.g., data that describes other data) about the warehouse 110. Examples of such facts can include the items that can be stored in the warehouse, warehouse storage spaces and their attributes, and/or the inventory itself. Examples of meta-data include properties of the items, how frequently items are ordered, how many items come in a box, how large a skid is. In some instances, the system 150 may assign some items to a top shelf of a storage space due to the infrequency of the use of the item in the workflow.

Some of these facts, like the state of items in the store and their location assignments, may change constantly, as they are affected by variable production volumes and/or high inventory turnover. Such facts can be referred to as dynamic meta-data facts. Non-limiting examples of dynamic meta-data facts are presented below:
- isDefined(i), where i represents a valid item within the production line.
- onInventory(w,i), where w is a warehouse and i is a valid item stored in w.
- onInventory(w,i,l), where w is a warehouse and i is a valid item stored in location l.

Other facts may remain unchanged for longer periods of time. Examples of such facts include ones that characterize information on the layout of the warehouse, and properties applied to its component. Such facts can be referred to as static facts. Non-limiting examples of static facts are presented below:
- isLocation(w,l), where w uniquely identifies a warehouse and l is a valid location.
- isLocation(w,l,x,y,z), where w is a warehouse, and l is at coordinates $\langle x,y,z \rangle$.
- canStore(w,l,i), where w is a warehouse, l is a location and i is an item.
- canStoreOver(w,l,$i_1$,$i_2$), where item $i_1$ can be placed on top of $i_2$ at location l
- maxCapacity(w,l,n), where a max of n of item i can be stored at location l Still other facts can mirror tactical actions (adding actions or retrieval actions) as they are enacted and completed by the workflow. Such facts can be referred to as operational facts. Static and dynamic facts are conditions or restrictions to be met in order for operational facts (e.g., actions) to be permissible. Non-limiting examples of operational facts mirroring adding actions are presented below:
- addToInventory(w,l,i), where w is a warehouse, l is a location and i is an item.
- addedToInventory(w,l,i), where w is a warehouse, l is a location and i is an item.

Non-limiting examples of operational facts miRRoring retrieval actions are presented below:
- retrieveFromInventory(w,l,i), w is a warehouse, l is a location and i is an item.
- retrievedFromInventory(w,l,i), w is a warehouse, l is a location and i is an item.

A knowledge engineer can define the literal names used to implement facts. In one or more arrangements, adding actions and/or retrieval actions can evaluate to true only when an enterprise service counterpart has correctly and successfully completed execution. Facts can be structured in any suitable manner. For instance, facts can be structured as declarative and atomic knowledge on the business of warehouse operation and inventory management. This knowledge can be used to establish a knowledge base by adding rules. The rules can be defined by Horn clauses in implication form: $p \land q \land \ldots \land t \Rightarrow u$. Such a formula can be interpreted as follows: if "p" is true and "q" is true, then "u" will be true.

Each literal in this Horn clause can be either an operational fact, a dynamic fact, or a static fact. The anticipated future state of the warehouse u will happen if and only if the entire conjunctive set $p \land q \land \ldots \land t$ holds, that is, if and only if all the conditions are met. Therefore, one example of a rule is as follows:

isDefined(i) $\land$ isLocation(w,l) $\land \neg$ OnInventory(w,i,l)
$\land$ canStore(w,l,i) $\land$ addToInventory(w,l,i) $\Rightarrow$ nextFIFO-Location(w,l,i)

This rule anticipates that i is will be the next best item to be retrieved from the warehouse provided that the adding action mirrored by addToInventory(w,l,i) has been successfully consumed and completed. If this holds, the knowledge base has searched for and found the best location where items can be added as "goods at rest" or as "goods in motion" so that the physical space is re-used as much as possible, keeping it optimally small. Note that nextFIFO-Location(w,l,i) is the consequence of the rule. Although nextFIFOLocation(w,l,i) is a literal itself, it is not part of the pool of facts.

If the above rule is completed successfully, the during state 220 will be reached. This means that the footprint of the warehouse 110 has changed, as items have been added and time has elapsed. Production can dictate when it is time to trigger the retrieval actions 250. An example of such a rule is presented below:

isDefined(i) $\land$ isLocation(w,l) $\land$ onInventory(w,i,l)
$\land$ retrievedFromInventory(w,l,i) $\Rightarrow$ retrieveOptimalFIFO(w,l,i)

If this rule completes successfully, an after state 230 will be reached. Item i has been found and retrieved from the warehouse, which remains with the smallest footprint possible. This after state 230 may now become the before state 210 at the start of the next iteration. The literal nextFIFOLocation(w,l,i) can be a goal too. Therefore, it is not an operational, dynamic or static fact.

Now that the various potential systems, devices, elements and/or components have been described, various methods for configuring a free location system will now be described. Referring now to FIG. 5, one example of such a method is shown. Various possible steps of method 500 will now be described. The method 500 illustrated in FIG. 5 may be applicable to the arrangements described above in relation to FIGS. 1-4, but it is understood that the method 500 can be carried out with other suitable systems and arrangements. Moreover, the method 500 may include other steps that are not shown here, and in fact, the method 500 is not limited to including every step shown in FIG. 5. The steps that are illustrated here as part of the method 500 are not limited to this particular chronological order. Indeed, some of the steps may be performed in a different order than what is shown and/or at least some of the steps shown can occur simultaneously.

At block 510, the before state 210 of the warehouse 110 can be defined. The before state 210 can be defined in any suitable manner. For instance, a user (e.g., the user 130 or some other person) can specify one or more dynamic facts and/or one or more static facts that will apply during the before state 210.

At block 520, one or more adding actions 240 can be defined. The one or more adding actions 240 can be applied to the warehouse 110. For instance, a user can specify operational facts that mirror adding actions that will be active between the before state 210 and the during state 220. Formulas can be determined for the set of behaviors that will anticipate an optimal warehouse once retrieval actions 250 are completed. The formulas can be written in any suitable form. In one or more arrangements, the formulas can include, at least in part, one or more Horn clauses.

At block 530, the during state 220 of the warehouse 110 can be defined. The during state 220 can be defined in any suitable manner. For instance, a user can specify one or more dynamic facts and/or one or more static facts that will apply during the during state 220.

At block 540, one or more retrieval actions 250 can be defined. The one or more retrieval actions 250 can be applied to the warehouse 110. For instance, a user can specify one or more operational facts mirroring retrieving actions that will be active between the during state 220 and the after state 230. Formulas can be determined for the set of behaviors that will complete item flow as items move out of the warehouse 110. The formulas can be written in any suitable form. In one or more arrangements, the formulas can include, at least in part, one or more Horn clauses.

At block 550, the after state 230 of the warehouse 110 can be defined. The after state 230 can be defined in any suitable manner. For instance, a user can specify one or more dynamic facts and/or one or more static facts that will apply during the after state 230.

At block 560, the facts and the rules can be reviewed. More particularly, the facts and the rules can be reviewed to ensure that they outline and describe the logic of the business at stake. For instance the facts can be written so that they describe the warehouse 110 as a physical space with a layout. Alternatively or in addition, the facts can be reviewed so that they portray the items 125 as discrete units of material associated to physical storage space during production. Alternatively or in addition, the facts can be reviewed so that they characterize the inventory 115 as a complete list of items 125 maintained as a source of material fed into the manufacturing process.

At block 570, the facts can be classified. Each fact can be classified into one of a predetermined set of categories. In one or more arrangements, the predetermined set of categories can include: operational facts mirroring adding actions, operational facts mirroring retrieval actions, dynamic meta-data facts, or static facts. In such case, the facts can be classified as one of: operational facts mirroring adding actions, operational facts mirroring retrieval actions, dynamic meta-data facts, or static facts.

At block 580, the rules can be written. More particularly, the rules can be written to ensure that they outline and describe the logic of the business at stake. For instance, the rules can be written so that they dynamically assign storage spaces 120 to the warehouse 110 with knowledge of how items 125 stored within will be consumed. Alternatively or in addition, the rules can be written with knowledge of when items have remained at rest during their time in the warehouse 110. Alternatively or in addition, the rules can be written with knowledge of when items have been mobile during their time in the warehouse 110. Alternatively or in addition, the rules can be written to portray maintenance as a set of actions designed to keep inventory small and in a state that is considered to be optimal at least from a cost-effectiveness standpoint.

At block 490, the facts and the rules can be applied to the rules engine. The rules engine can have an associated production memory and an associated working memory. The rules engine can also include an inference engine. The facts and the rules can be stored in any suitable memory. For example, the rules can be stored in production memory. Facts that the inference engine matches against can be stored in working memory. The inference engine needs to match each rule in the ruleset with all appropriate facts to decide whether to execute the rule or not.

A decision tree can be built to search for rules that match facts. A rule can be selected to fire using a conflict resolution strategy. All possible actions can be bound to services that gather and calculate KPIs as quantifiable measures. The inference engine can build the decision tree to make optimal decisions. The inference engine can be configured to process a large number of rules and facts. The inference engine can match facts and data, against production rules to infer conclusions which result in actions. The pattern matching can occur repeatedly. In each cycle, the list of facts may change and new facts may be added or old facts may be removed, causing previously unsatisfied patterns to be satisfied.

The inference engine can be configured to use any suitable pattern matching algorithm. For instance, the inference engine can be configured to use the Rete matching algorithm. The use of such an algorithm can streamline the processing of facts and rules. Such an algorithm can avoid iterating through the data elements by storing the current contents of the conflict set in memory, only adding and deleting items form it as data elements are added and deleted from memory. The efficiency of the Rete matching algorithm may especially be realized when the number of rules is large and the number of objects in memory is small.

Figure 4:
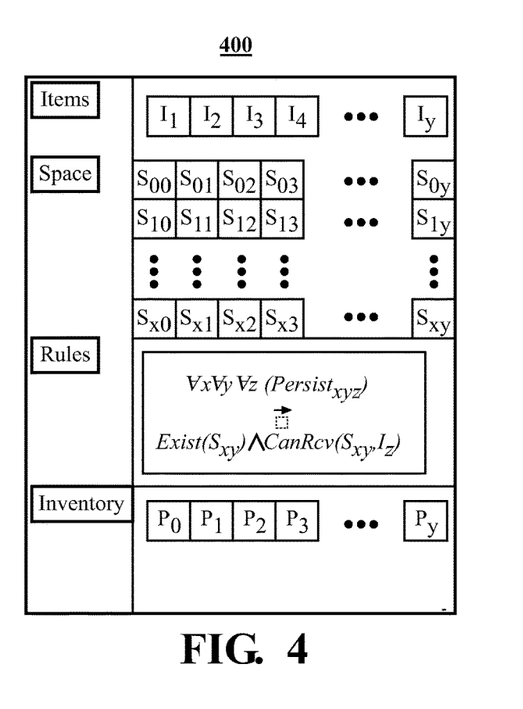
FIG. 4 is an example of a portion of a rules engine.
Figure 5:
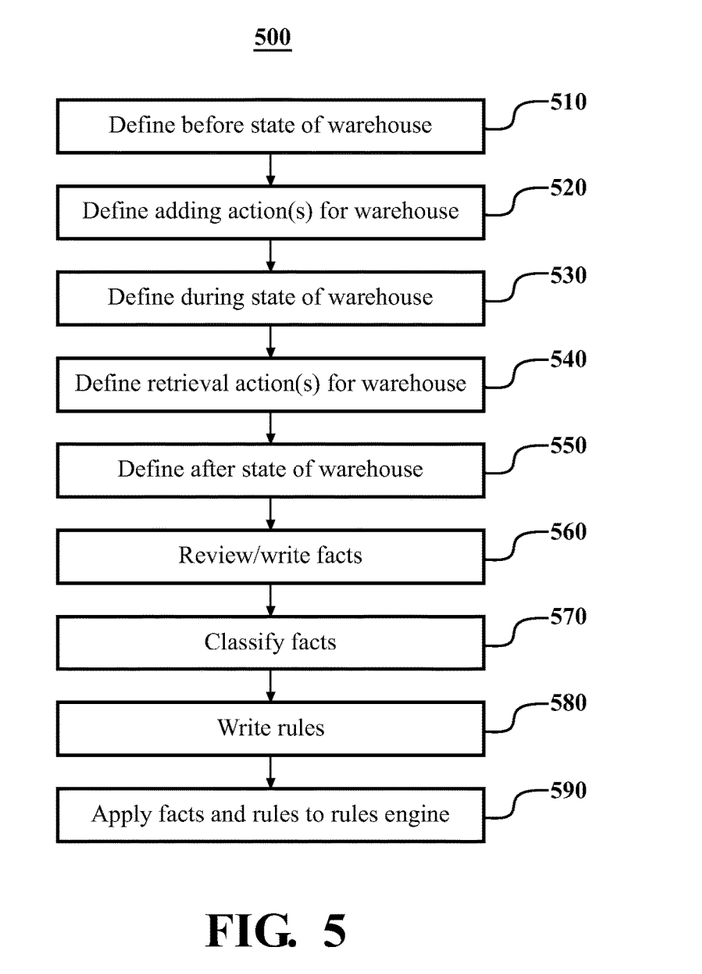
FIG. 5 is an example of a method of configuring a free location system.

FIG. 4 is an example of a portion of a rules engine 400. The rules engine 400 can include information on all available items 125 that can be used in the warehouse 110, including the specifications (e.g., properties) of the items 125 can be stored in the warehouse 110. The rules engine 400 can also include a list of all available storage spaces 120 and a description of the layout of the storage spaces 120. For instance, the layout of a storage space can be linear, square, cube, etc. The rules engine 400 can include specifications of which items each storage space can hold. The rules engine 400 can also include a list of which items 125 are stored in inventory 115.

The rules engine 400 can include one or more rules. The rules can be an array of rules governing access to persistent storage. A given item (I) may be stored (Persist) in a space (S) if the space whose coordinates are x,y exist (Exist) and such item can actually be received (CanRcv) at S. The rules engine 400 can also include facts about the warehouse 110 and the rules that use the facts. Facts can be loaded into the current stateful or stateless knowledge session before any rules are invoked. The rules engine 400 can include the current inventory 115 of the warehouse 110.

One example of an implementation of the above method will now be described. In one implementation, arrangements described herein can be used to control the release of painted bodies in a warehouse to an assembly plant. The free location determination module 175 can provide body information and routing requests to a conveyor controller. The conveyor controller can supervise the operation of conveyor equipment in a selectivity bank (e.g., a warehouse). Through use of these routing instructions, a storage system controller can determine which painted bodies are extracted from the selectivity bank.

The selectivity bank can be made up of a plurality of queues. Each queue can include a conveyor used to accept, move and release bodies. Each body can correspond to an invoice. The distribution of the bodies on the plurality of queues can depend on routing instructions, which, in turn, can respond to particular production needs. Thus, the sequence of bodies as they are received in and move through the selectivity bank can depend on what vehicles needs to be produced first. Thus, it is an example of footprints in motion.

The before state 210 of the warehouse 110 can be defined. A user can specify static facts that will be active during the before state 210. For purposes of this example, some non-limiting examples of static facts that will be active during the before state 210 are presented below:

isRFAntenna(n,l,i), where r is an RF specification, l is a location, and n is an antenna identifier isInterfaceController(c,t), where c is a controller name and t is a controller type isLocalHMIPC(p,t,l), where p is a PC identifier, t is a PC type, and l is a location isQueue(q,c,l), where q is a queue identifier, c is the capacity of the queue, and l is a location. Queues can be defined and re-configured only during shutdown and on model changes.

canEnqueue(q,b,r), where q is a queue identifier, b is a body number, and r is the body specification record of b.

A user can specify dynamic facts that will be active during the before state 210. For purposes of this example, a non-limiting example of a static fact that will be active during the before state 210 is presented below:

isBody(n,s,r), where s is a body specification, r is a body specification record, and n is a body number. As bodies come into the shop from the paint line, they can be added as facts to the decision tree.

The adding actions 240 that will apply to the warehouse can be defined. For instance, a user can specify operational facts mirroring adding actions that will be active between the before state 210 and the during state 220. A non-limiting example of such an operational fact mirroring adding actions is presented below:

isBodyIdentified(a,b), where a is a an RF antenna, b is a body number

Further, the adding actions 240 can be defined by the user by writing formulas (i.e. Horn clauses) for the set of behaviors that will anticipate an optimal warehouse once retrieval actions are complete. An example of such formulas is presented below:

isLocalHMIPC(hmi$_{pc}$,remote,pc$_{control}$) $\wedge$ isQueue(q1,20, storage1) $\wedge$ isBody(n,s,r) $\wedge$ canEnqueue(q1,n,i) $\wedge$ isBodyIdentified(a1,n) $\Rightarrow$ okToAdd(n,s,q1)

The during state 220 of the warehouse 110 can be defined. A user can specify static facts that will be active during the during state 220. For purposes of this example, some non-limiting examples of static facts that will be active during the during state 220 are presented below:

isRFAntenna(n,l,i), where r is an RF specification, l is a location, and n is an antenna identifier isFSSController(c,t), where c is a controller name and t is a controller type isRemoteHMIPC(p,t,l), where p is a PC identifier, t is a PC type, and l is a location isQueue(q,c,l), where q is a queue identifier, c is the capacity of the queue, and l is a location. In one or more arrangements, queues can be defined and re-configured only during shutdown and on model changes.

canDequeue(q,b,r), where q is a queue identifier, b is a body number, and r is the body specification record of b.

requestHoldCheck(b,r), where b is a body number and r is release code indicating if the painted body can be released to the assembly shop.

A user can specify dynamic facts that will be active during the during state 220. For purposes of this example, some non-limiting examples of static facts that will be active during the during state 220 are presented below:

isBody(n,s,r), where s is a body specification, r is a body specification record, and n is a body number. As bodies come into the shop from the paint line, they can be added as facts to the decision tree.

isDollyRoutingInstruction(n,i,d), where n is a body specification, i is a routing instruction to the conveyor controller, and d is a dolly number. Upon receiving a request for routing information from a conveyor controller, a storage system controller can send a routing instruction to the conveyor controller. These will be added as facts to the decision tree.

The retrieval actions 250 that will apply to the warehouse 110 can be defined. For instance, a user can specify operational facts mirroring retrieving actions that will be active between the during state 220 and the after state 230. A non-limiting example of such an operational fact mirroring adding actions is presented below:

executeMergeRouting(b,s,c,i,q), where b is a body number, s is a set of body specification data, c is a set of continuous conditions, i is a set of interval conditions, and q is an assembly sequence number.

Further, the retrieval actions 250 can be defined by the user by writing formulas (i.e. Horn clauses) for the set of behaviors that will complete materials flow as items move out of the warehouse. An example of such formulas is presented below:

isQueue(q1,20,storage1) $\wedge$ isBody(b1,s,rb1)

canDequeue(q1,b1,rb1) $\wedge$ isDollyRoutingInstruction(n, ri1,dolly1) $\Rightarrow$ executeMergeRouting(b1,rb1,c,i,seq1)

requestHoldCheck(b1,rc$_{o01}$) $\wedge$ executeMergeRouting(b1, rb1,c,i,seq1) $\Rightarrow$ okToRelease(b1,s,q1)

The after state 230 of the warehouse 110 can be defined. A user can specify dynamic facts that will be active during the after state 230. For purposes of this example, a non-limiting example of dynamic facts that will be active during the after state 230 are presented below:

requestHoldCheck(b,r), where b is a body number and r is release code indicating if the painted body can be released to the assembly shop.

A user can specify static facts that will be active during the after state 230. For purposes of this example, a non-limiting example of static facts that will be active during the after state 230 are presented below:

isDollyRoutingInstruction(n,i,d), where n is a body specification, i is a routing instruction to the conveyor controller, and d is a dolly number. Upon receiving a request for routing information from a conveyor controller, the storage system controller can send a routing instruction to the conveyor controller. These will be added as facts to the decision tree.

Maintenance can be portrayed as a set of actions designed to keep the list small and in a state that is considered to be optimal from the cost-effectiveness point of view. An example of such a portrayal of maintenance is presented below:

requestHoldCheck(b1,$rc_{001}$)∧
executeMergeRouting(b1,rb1,c,i,seq1)∧okToRelease (b1,s,q1)⇒
route(C3055D01,b1,seq1)

The above arrangements can configure the system for optimized control of the release of painted bodies in a warehouse to an assembly plant. A controller can determine which painted bodies are extracted from the selectivity bank.

Figure 6:
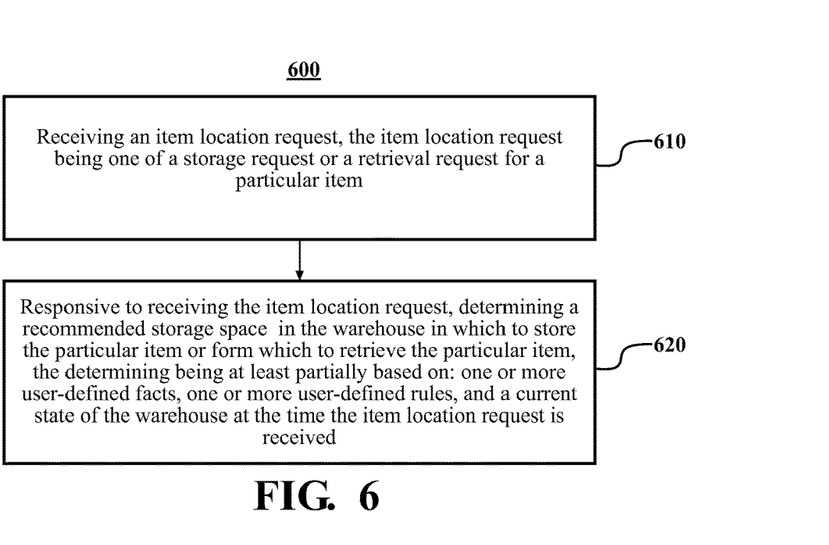
FIG. 6 is an example of a free location method for managing the storage and/or retrieval of items.

Now that the various potential systems, devices, elements and/or components have been described, various methods for managing an inventory in a warehouse will now be described. Referring now to FIG. 6, one example of such a method is shown. Various possible steps of method 600 will now be described. The method 600 illustrated in FIG. 6 may be applicable to the arrangements described above in relation to FIGS. 1-5, but it is understood that the method 600 can be carried out with other suitable systems and arrangements. Moreover, the method 600 may include other steps that are not shown here, and in fact, the method 600 is not limited to including every step shown in FIG. 6. The steps that are illustrated here as part of the method 600 are not limited to this particular chronological order. Indeed, some of the steps may be performed in a different order than what is shown and/or at least some of the steps shown can occur simultaneously.

At block 610, an item location request 140 can be received. The item location request 140 can be a storage location request for a particular item. For instance, a particular item may be received at the warehouse 110. Alternatively, the item location request 140 can be a retrieval location request for a particular item. For instance, a particular item in storage may be needed for use in the workflow being performed at the warehouse 110.

At block 620, responsive to receiving the item location request 140, a recommended storage space in the warehouse 110 in which to store the particular item or from which to retrieve the particular item (item location recommendation 145) can be determined. The determining can be at least partially based on: one or more user-defined facts, one or more user-defined rules, and/or a current state of the warehouse at the time the item location request is received. The user-defined facts can relate to an item, the inventory, the plurality of storage spaces, and/or the warehouse. The user-defined rules can be configured to dynamically assign storage spaces to the warehouse based at least partially on user-defined indications of how items will be consumed during a workflow performed within the warehouse.

The method 600 can end. Alternatively, the method 600 can return to block 610. As a further alternative, the method 600 can include additional and/or alternative blocks (not shown). For instance, the method can include presenting the recommended storage space (item location recommendation 145) to a user. Alternatively or in addition, the method 600 can include receiving a confirmation that the particular item has been stored in or retrieved from the recommended storage space. In such case, the method 600 can further include, responsive to receiving a confirmation that the particular item has been stored in or retrieved from the recommended storage space, updating the user-defined facts or the user-defined rules based current state of the warehouse.

A non-limiting example of the operation of the above systems and methods will now be presented. Arrangements described herein can be used to store one or more items 125 received at the warehouse 110. A user 130 can indicate to the inventory optimization system 150, such as by using the input system 165, that a box of item A has been received.

The system, automatically or in response to receiving the user's input, can determine a recommended storage space 120 within the warehouse 110 to store item 1. Based on the user-defined facts associated with item 1, the free location determination module 175 can analyze item 1 relative to the various rules and the current state of the warehouse 110. The rules can be analyzed using a matching algorithm, such as the Rete algorithm. The matching algorithm can search and find static and dynamic rules triggers. The static rules trigger can indicate that an incoming item can be stored in a particular location. The dynamic rules trigger can consider the pipeline information of the warehouse 110. In one or more arrangements, the module 175 can be configured so that the item location recommendation 145 is based on the first matching rule.

Figure 7:
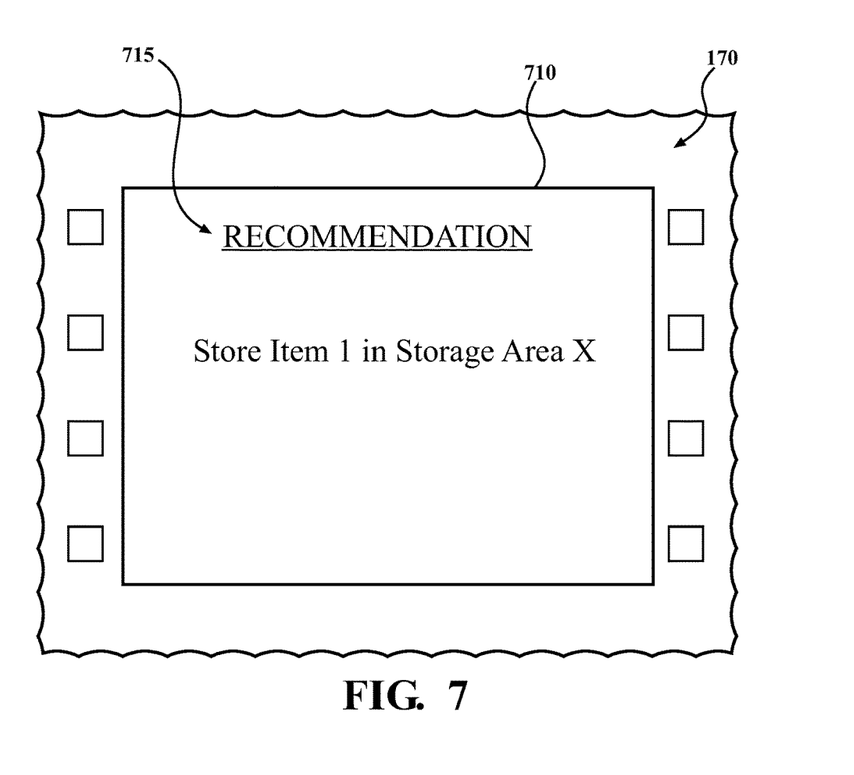
FIG. 7 is an example of an output system of an inventory optimization system, wherein an item location recommendation is presented to a user.

The determined recommended storage space (item location recommendation 145) can be presented to the user 130. In one or more arrangements, the item location recommendation 145 can be presented to a user in a visual form. For instance, FIG. 7 shows an example in which the determined item location recommendation 145 is presented as a message 715 on a display 710. In one or more arrangements, the display 710 can be a display of the output system 170 of the system 150. A "display" is defined as a component or a group of components that present information/data in visual form, including, for example, video, images, graphics, etc. The item location recommendation 145 can have any suitable form, content and features. Thus, it will be understood that the message 715 shown in FIG. 7 is provided merely as an example and is not intended to be limiting.

The user 130 can take item 1 to the storage space 120 corresponding to the item location recommendation 145. A confirmation of the user's storage of item A in the item location recommendation 145 can be received. The system 150 can be updated accordingly.

It will be appreciated that arrangements described herein can also be used to retrieve one or more items 125 from a storage space 120. A user 130 can provide an input to the system 150, such as by using the input system 165, that he or she is looking for a particular item 125 to retrieve from storage. The system 150 can review at the current state of the inventory and the pipeline. The system 150 can check withdrawal rules. When an optimized location for the item is determined, a message can be presented on the display 710. The user 130 can proceed to that location to retrieve the item.

Figure 8A:
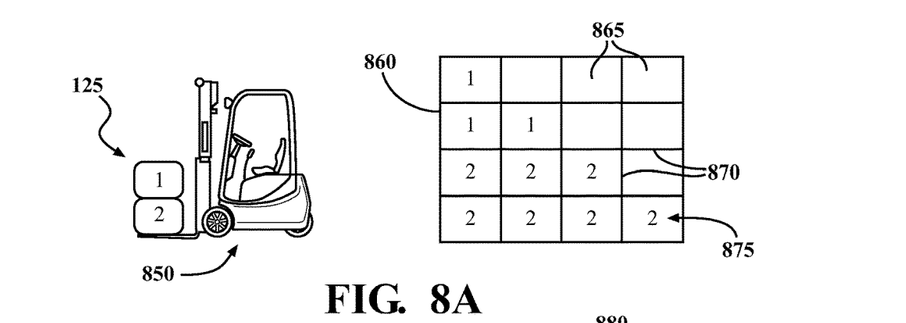
FIGS. 8A-8D show an example of the operation of a free location system.

Another example of the use of the subject matter described herein will be presented with respect to FIGS. 8A-8D. In the warehouse of this example, items are not stored at fixed locations, but rather at the next available location. Referring to FIG. 8A, items 125 can arrive at a shipping dock or other receiving station. The items 125 can be picked up by a forklift 850. The user 130 (e.g., the forklift operator) needs to know where to take the items 125. The user 130 can obtain such information in any suitable manner.

For example, in one or more arrangements, a free location display 860 can be provided in the warehouse 110. The forklift operator can view a free location display 860. The free location display 860 can be a part of the output system 170 of the inventory optimization system 150. The free location display 860 can be any suitable type of display.

The free location display 860 can present any suitable information about the storage spaces 120 in the warehouse 110. The information can be presented in any suitable form. As an example, in one or more arrangements, the display 860 can present a map, floorplan, or other representation of the warehouse 110 or a portion of the warehouse 110. In some instances, a grid 870 can be overlaid on the map or other representation of the warehouse or portion of the warehouse to define the plurality of cells 865. Each cell 865 of the grid 870 can represent a storage space 120. The size of the cells 865 may or may not be identical.

The cells 865 can indicate the current condition of the represented storage spaces 120. If a storage space 120 is currently full, a suitable marker 875 can be presented in the cell 865 to represent such condition. Similarly, if a storage space 120 is not full or is empty, the cell 865 can be represented as such.

Figure 8B:
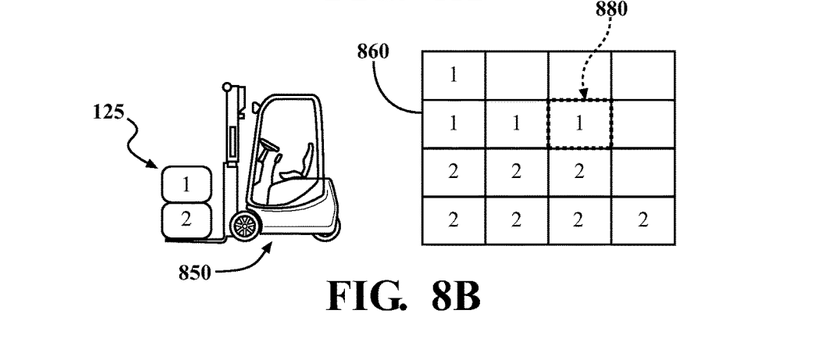

One of the available cells can be selected in any suitable manner. For instance, in one or more arrangements, the operator can select any available empty cell. Alternatively or in addition, the system 150 can select one of the available cells based on the arrangements described herein. The selected cell 880 can be marked to indicate that it is a recommended cell, as is shown in FIG. 8B. For instance, the cell 880 can be highlighted or otherwise marked to indicate that the associated storage space is the recommended cell. The marking of the cell 880 can be performed automatically by the system 150 or in response to an operator input.

Figure 8C:
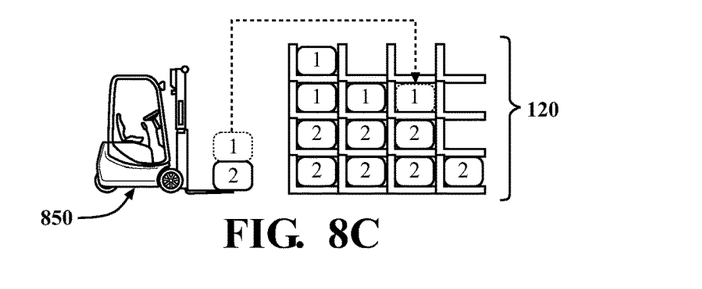

The user can take the item(s) to the storage space 120 corresponding to the selected cell 880, as is shown in FIG. 8C. The user can store the item 125 in the storage space 120.

Figure 8D:
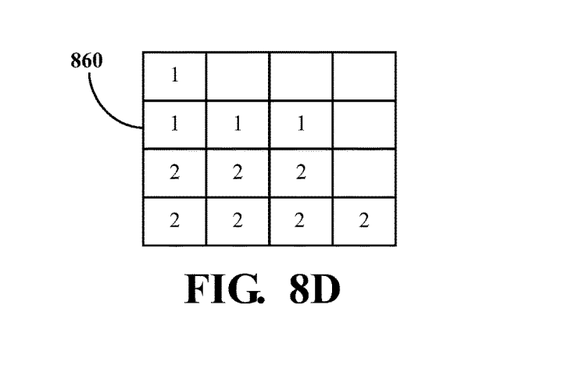

As is shown in FIG. 8D, the display 860 can be updated so that other users in the warehouse would not attempt to use that storage space 120 until it becomes available again. Arrangements herein can be configured to help maintain the free location display 860 in sync with the actual condition of the storage spaces 120 and/or to ensure that the operator will choose a storage space 120 that optimizes storage. For instance, arrangements described herein can work in conjunction with one or more technologies to confirm delivery and storage of items in the warehouse. Examples of such technologies can include barcodes, QR codes, GPS, and/or other technologies for influencing the behavior of the business.

Thus, a user can scan a barcode or QR code each time an item 125 is placed in or retrieved from a particular storage space 120. The scanning of such codes can cause the display to be automatically updated to reflect the current status of the storage space 120.

It will be appreciated that the rules and facts can be easy to write, understand and maintain. For instance, facts can describe if it is possible to store a particular item in a given location. For example, if it is true that location 'A' in store 'SA60400' is allowed to store items of type '1', then this can constitute a fact. It can be characterized it as follows:

CanStore('SA60400', 'A', '1')

Some facts, such as the one above, can come from knowledge provided by subject matter experts. Some of such facts can tend to be static because they do not change much over time. Other facts are more dynamic because they are true only for limited time intervals. Such facts can be updated from production databases. For example, the fact that location 'A' at store 'SA6040' is currently full may be represented as:

IsFull('SA60400', 'A', status). Where status=true

Facts can be used within rules to come up with decisions. For example, an operator of a forklift that has picked up an item of type '1' may be asked to drive to location 'A' if and only if:

CanStore('SA60400', 'A', '1')AND IsFull('SA60400', 'A', status). Where status=false This has now become a rule that recommends the driver what location to drive to.

BestLocationToDrive(Address)=CanStore('SA60400', Address, '1')AND IsFull('SA60400', Address, status). Where status=false Thus, the result can be a method that can direct operators in a free location system to a particular area to add and/or remove inventory. As an example, the logic above can recommend a location to a fork lift operator to add inventory to. A computer application can provide visual instructions and/or other feedback to operators that are synchronized with actual physical storage conditions. These methods can be used with other technologies for tracking inventory to keep indications updated for the current status of the environment.

In one example, location A can store Items type 1 and 2. Location B can store Item type 1. Location B is full, location A is empty. If new Item type 1 has arrived, then according to arrangements described herein the system can recommend that the operator store the incoming Item type 1 at Location A.

It will be appreciated that arrangements described herein can provide numerous benefits, including one or more of the benefits mentioned herein. For example, arrangements described herein can facilitate efficient inventory control. Arrangements described herein can minimize time management component by reducing footprint of its workflow. Arrangements described herein can allow an enterprise application and operational data to describe, manage, and maintain shared inventory space (e.g., assets).

Arrangements described herein can treat all assets in a way such that they can be morphed and adapted to model many different scenarios and situations. Arrangements described herein can allow flexibility to allow changes to the layout of a store may be implemented as a new configuration without having to re-implement the whole solution.

Arrangements described herein can minimize footprint of any storage space affected by variable production volumes and/or high inventory turnover. Arrangements described herein can enables inventory managers to continuously optimize the allocation of spaces in ways that facilitate sharing them among multiple "goods at rest" in an industrial setting where there also exists a time management component that includes labor involved in handling materials as they move in, within and out of the warehouse.

Arrangements described herein can be flexible to optimize the footprint on stores that host both goods at rest as well as those in motion. Arrangements described herein can reduce the footprint of a store by incorporating inventory and warehouse metadata as part of the formal framework for describing and enacting business logic and knowledge that provision data and actions which, when applied, facilitate an optimal warehouse footprint, both the one used to keep items at rest as well as the area used to move materials or other assets through a manufacturing process. It provides conduits for sharing spaces among multiple items. Arrangements described herein can help to condense the space for the various items in inventory, thereby reducing the need for overall space.

Arrangements described herein can be applied to diverse domains. For instance, arrangements described herein can be used in connection with inventory control in a warehouse. However, arrangements described herein are not limited in this respect. Indeed, Arrangements described herein can be applied to other processes that do not necessarily use space for keeping "goods at rest." Arrangements described herein can be easily applied to multiple store configurations, workflows, situations, and industrial settings.

Arrangements described herein can be easily applied to multiple warehouse types, workflows, store configurations and scenarios. As such, arrangements described herein can be a dynamic tool. As a result, changes to the layout of a warehouse can be implemented as a change in configuration only, without having to re-implement the whole solution. Thus, arrangements described herein can provide a generic solution that handles various inventory situations without having to rewrite a core methodology each time handle the same problem.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of managing an inventory in a warehouse, the inventory including a plurality of items, the warehouse including a plurality of storage spaces for storage of the plurality of items, the method comprising:

receiving an item location request, the item location request being one of a storage request or a retrieval request for a particular item;

responsive to receiving the item location request, determining, using one or more processors, a recommended storage space in the warehouse in which to store the particular item or from which to retrieve the particular item, the determining being at least partially based on: one or more user-defined facts, one or more user-defined rules, and a current state of the warehouse at the time the item location request is received, the determining including:

identifying the user-defined facts that apply to the particular item of the item location request; and matching the identified user-defined facts to the user-defined rules using a pattern matching algorithm executed on the one or more processors, the pattern matching algorithm including a Rete algorithm, the user-defined facts relating to at least one of an item, the inventory, the plurality of storage spaces, or the warehouse, each of the user-defined facts being classified as one of: an operational fact mirroring adding actions, an operational fact mirroring retrieval actions dynamic meta-data fact, or a state fact, the user-defined rules being configured to dynamically assign storage spaces to the warehouse based at least partially on user-defined indications of how items will be consumed during a workflow performed within the warehouse, at least one of the one or more user-defined facts or at least one of the one or more user-defined rules being at least partially defined by a Horn clause; and causing a robot to store the particular item in or retrieve the particular item from the recommended storage space, the robot being operatively connected to the one or more processors, whereby the inventory of the warehouse is optimized.

2. The method of claim 1, further including:
displaying the recommended storage space to a user.

3. The method of claim 1, further including:
receiving a confirmation that the particular item has been stored in or retrieved from the recommended storage space.

4. The method of claim 3, further including:
responsive to receiving a confirmation that the particular item has been stored in or retrieved from the recommended storage space, updating the user-defined facts or the user-defined rules based on a current state of the warehouse.

5. The method of claim 1, further including:
receiving a user-defined before state of the warehouse, wherein the before state includes user-defined dynamic facts and user-defined static facts that will be active during the before state;

receiving a user-defined during state of the warehouse, wherein the during state includes user-defined dynamic facts and user-defined static facts that will be active during the during state; and receiving a user-defined after state of the warehouse, wherein the after state includes user-defined dynamic facts and user-defined static facts that will be active during the after state.

6. The method of claim 5, further including:
receiving user-defined adding actions for the warehouse, wherein the user-defined adding actions include operational facts mirroring adding actions that will be active between the before state and the during state, and wherein the user-defined adding actions include formulas for describing a set of behaviors that will anticipate an optimal warehouse once retrieval actions are completed; and receiving user-defined retrieval actions for the warehouse, wherein the user-defined retrieval actions include operational facts mirroring retrieval actions that will be active during the during state and the after state, and wherein the user-defined retrieval actions include formulas for describing the set of behaviors that complete materials flow as items move out of the warehouse.

7. The method of claim 1, further including:
receiving the one or more user-defined rules, wherein the one or more user-defined rules are configured to portray a set of actions designed to keep the inventory in an optimal state based on cost-effectiveness, and wherein the optimal state is achieved when one or more key performance indicators has been reached.

8. A system for managing an inventory in a warehouse, the inventory including a plurality of items, the warehouse including a plurality of storage spaces for storage of the plurality of items, the system comprising:

a user input system;

a robot; and one or more processors operatively connected to the user input system and to the robot, the one or more processors being programmed to initiate executable operations comprising:

receiving an item location request from the user input system, the item location request being one of a storage request or a retrieval request for a particular item;

responsive to receiving the item location request, determining a recommended storage space in the warehouse in which to store the particular item or from which to retrieve the particular item, the determining being at least partially based on: one or more user-defined facts, one or more user-defined rules, and a current state of the warehouse at the time the item location request is received, the determining including:

identifying the user-defined facts that apply to the particular item of the item location request; and matching the identified user-defined facts to the user-defined rules using a pattern matching algorithm, the user-defined facts relating to at least one of an item, the inventory, the plurality of storage spaces, or the warehouse, each of the user-defined facts being classified as one of: an operational fact mirroring adding actions, an operational fact mirroring retrieval actions dynamic meta-data fact, or a state fact, the user-defined rules being configured to dynamically assign storage spaces to the warehouse based at least partially on user-defined indications of how items will be consumed during a workflow performed within the warehouse, at least one of the one or more user-defined facts or at least one of the one or more user-defined rules is at least partially defined by a Horn clause; and causing the robot to store the particular item in or retrieve the particular item from the recommended storage space, whereby the inventory of the warehouse is optimized.

9. The system of claim 8, further including:
   an output system including a display, and wherein the executable operations further include causing recommended storage space to be presented to the user on the display.

10. The system of claim 8, wherein the executable operations further include:
    receiving a confirmation that the particular item has been stored in or retrieved from the recommended storage space; and
    responsive to receiving a confirmation that the particular item has been stored in or retrieved from the recommended storage space, updating the user-defined facts or the user-defined rules based on a current state of the warehouse.

11. The system of claim 8, wherein the executable operations further include:
    receiving a user-defined before state of the warehouse, wherein the before state includes user-defined dynamic facts and user-defined static facts that will be active during the before state;
    receiving a user-defined during state of the warehouse, wherein the during state includes user-defined dynamic facts and user-defined static facts that will be active during the during state; and
    receiving a user-defined after state of the warehouse, wherein the after state includes user-defined dynamic facts and user-defined static facts that will be active during the after state.

12. The system of claim 11, wherein the executable operations further include:
    receiving user-defined adding actions for the warehouse, wherein the user-defined adding actions include operational facts mirroring adding actions that will be active between the before state and the during state, and wherein the user-defined adding actions include formulas for describing a set of behaviors that will anticipate an optimal warehouse once retrieval actions are completed; and
    receiving user-defined retrieval actions for the warehouse, wherein the user-defined retrieval actions include operational facts mirroring retrieval actions that will be active during the during state and the after state, and wherein the user-defined retrieval actions include formulas for describing the set of behaviors that complete materials flow as items move out of the warehouse.

13. The system of claim 8, wherein the executable operations further include:
    receiving the one or more user-defined rules, wherein the one or more user-defined rules are configured to portray a set of actions designed to keep the inventory in an optimal state based on cost-effectiveness, and wherein the optimal state is achieved when one or more key performance indicators has been reached.

* * * * *

UNITED STATES PATENT AND TRADEMARK OFFICE
CERTIFICATE OF CORRECTION

PATENT NO. : 10,229,385 B2
APPLICATION NO. : 14/823709
DATED : March 12, 2019
INVENTOR(S) : Gregory Evers et al.

Page 1 of 1

It is certified that error appears in the above-identified patent and that said Letters Patent is hereby corrected as shown below:

On the Title Page

Item (54), delete "FREE LOCATION ITEM AND STORAGE RETRIEVAL" and insert --FREE LOCATION ITEM STORAGE AND RETRIEVAL--

In the Specification

Column 9, Line 16, delete "$(e.g., \neg p \neg \vee q \vee \cdots \neg t \vee u).$" and insert --$(e.g., \neg p \vee \neg q \vee \cdots \neg t \vee u).$--

Column 10, Line 23, delete "p∧q∧ . . . t⇒u." and insert --$p \wedge q \wedge \cdots \wedge t \Rightarrow u.$--

Column 10, Line 29, delete "p∧q∧ . . . ∧t" and insert --$p \wedge q \wedge \cdots \wedge t$--

Signed and Sealed this
Twenty-first Day of May, 2019

Andrei Iancu
*Director of the United States Patent and Trademark Office*